Aug. 11, 1959 S. Z. CARNO 2,898,798
BLIND RIVET WITH SEALING MEANS
Filed April 5, 1956
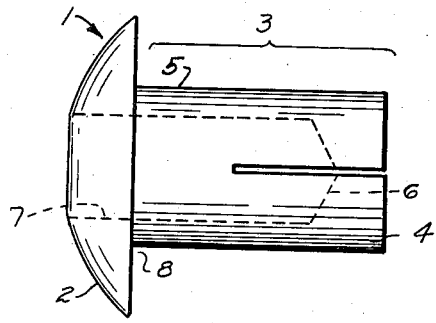
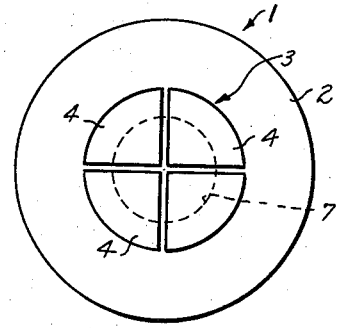
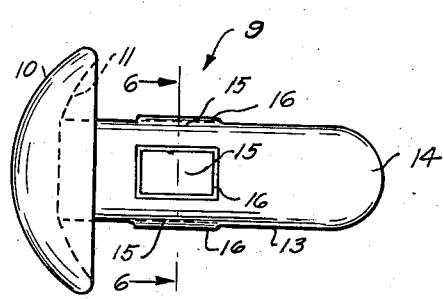
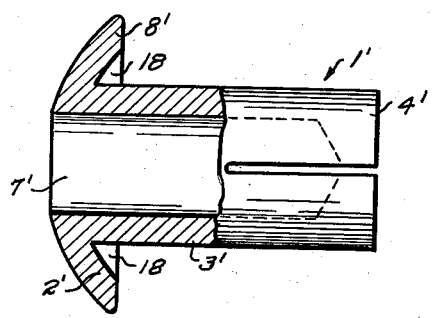
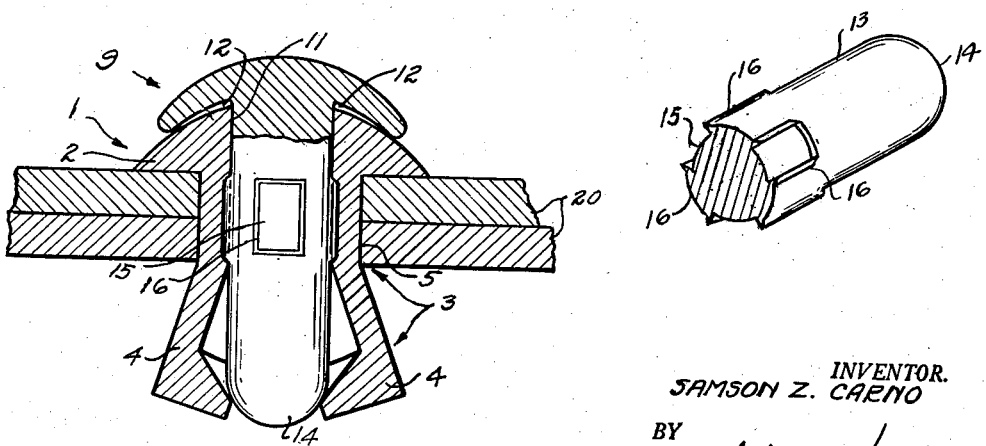
INVENTOR.
SAMSON Z. CARNO
BY
ATTORNEYS

UNITED STATES PATENT OFFICE

2,898,798

BLIND RIVET WITH SEALING MEANS

Samson Z. Carno, Rome, N.Y.

Application April 5, 1956, Serial No. 576,505

2 Claims. (Cl. 85—40)

(Granted under Title 35, U.S. Code (1952), sec. 266)

The invention described herein may be manufactured and used by or for the United States Government for governmental purposes without payment to me of any royalty thereon.

This invention relates to an improved fastening device, and more particularly, to the blind rivet type of fastening device for the permanent connection of superimposed structural materials where the inside material is inaccessible and, in general, whenever a self-anchoring, waterproof rivet is desired.

It is well known in the art to provide a blind rivet of the type consisting of an outer seat portion provided with prongs at its extremity and a pin member driven into the seat to force the prongs outwardly to clamp the materials together. Rivets have also been designed wherein the pin member is provided with protuberances on its surface to more securely retain the pin inside the seat against the effect of vibration and wear once the pin has been driven into the seat.

Certain disadvantages have attended the use of the above-described rivets, particularly that of water seepage, either around the seat member or between the pin and seat member, into the inside of the structure. The problem of water seepage becomes especially acute where the protuberances provided on the surface of the pin form narrow grooves on the inner seat surface, when driven into position, for passage of water. As a result, the riveted material is not water-proof and the rivet becomes more subject to deterioration. Also, the rivets of the type having long, narrow protuberances or ridges tend to slip out of the seat through the grooves formed when high vibration or pressure is exerted outwardly upon them.

The improved rivet of the present invention eliminates these defects by providing compact, protected surfaces to enclose a sealing compound applied to both the outer seat portion and pin member which will thereby prevent breaking or wearing away of the sealing compound, will not interfere with the effectiveness of the rivet as a fastener, and will act as a stop member to insure more accurate placement of the pin within the seat.

Further, a notch configuration is formed a minimum distance off the pin surface which will apply an outward force against a larger area of the inner seat surface, and which will hold the pin securely in position against vibration and pressure exerted against it in any direction. The protected surface will also co-operate with the notch configuration, to be described, to provide a fully waterproof, self-anchoring blind rivet.

Other objects and advantages will become apparent from the following description and accompanying drawings in which:

Fig. 1 is a side sectional view of the outer seat portion;
Fig. 2 is a bottom end view of the member shown in Fig. 1;
Fig. 3 is a side view of the inner pin member;
Fig. 4 is a view partly in section and partly in elevation showing the rivet assembly in anchored position.

Fig. 5 is a side view partly in section showing a modified form of rivet.

Fig. 6 is a fragmentary perspective view of the notch formation provided on the pin member.

Referring more particularly to the drawings, there is shown in Fig. 1 the outer sleeve or seat member 1 having a mushroom or button-shaped head or annular cover portion 2 and a cylindrical portion or shank 3 provided with an upper grip portion 5 and prongs or leg portions 4 at its distal end formed by the crosswise slicing or slitting of the shank 3 along its longitudinal axis into quadrants in the shank. The outer seat portion 1 is further provided with a cylindrical opening or bore 7 extending axially through the upper grip portion 5 and intersecting the legs 4 at the lower end of the shank to form a conical-shaped recess 6.

Fig. 3 illustrates an inner pin member or spreader stud 9 having an umbrella-shaped head 10, of a smaller diameter than that of the head 2, having a curved undersurface 11 which will align itself when positioned with the top surface of the head 2 to provide a narrow space 12 between the head surfaces for injection of the sealing compound, as shown in Fig. 4.

The inner pin member 9 is further provided with a shaft 13 of a diameter equal to the diameter of the cylindrical socket 7 to obtain a close working fit between the pin member and the seat member when combined. At the distal end of the shaft 13 there is provided a rounded or hemispherical nose portion 14 which when driven into the recess of the opening 7 will apply an equal camming force to each inner tapered portion 6 of the legs 4 formed at the inner end of the conical recess 6. The shaft portion 13 should be sufficiently long so that it will longitudinally extend from the top surface of the head 2 to the lower edge of the legs 4 in order to insure adequate and permanent spreading of the legs 4 and clamping of the riveted material by the prongs or legs 4 when moved outwardly. Three rectangular notches 15 each having an encircling ridge 16 are circumferentially spaced around the shaft 13 120° apart and positioned, when the pin member 9 is in its driven position within the seat portion 1, intermediate the base of the head 2 and the point of divergence of the legs 4, as shown in Fig. 4. Each ridge 16 is pressed outwardly and raised slightly above the surface of the shaft 13 in such a way as to slightly expand the shank 3 when the pin member is forced into the opening 7 and to hold the shaft 13 tightly within the grip portion.

In Fig. 5 there is shown a modified form of seat member 1' in which the head portion 2' is provided with an annular space or cavity 18 in the undersurface 8' about the shank portion 3'. This cavity will hold the sealing compound injected into it about the rivet hole and the head 2' will protect the compound from breaking away in any kind of handling, thus making the rivet fully waterproof.

In construction, all dimensions of the outer seat members and pin members will, of course, be determined by the thickness and openings in the material to be riveted. The shank portion 3 is designed to have a diameter equal to that of the rivet hole, the grip portion 5 in length being slightly less than the thickness of the riveting material, and the legs 4 extending from a point above the inner surface of the rivet material for a distance equal to that of the grip portion of the shank. The conical recess at the end of opening 7 is tapered sharply inwardly in such a way that the end of the rounded nose portion 14 will first strike the inner tapered portion of the recess 6, the upper portion of the nose 14 not becoming flush with the tapered surfaces until the pin member has been driven completely into the seat member. In general, the dimensions of the pin member 9 will be relative to those of the seat member, the diameter of the shaft 13 being equal to that of the opening 7 and the length of the shaft equal to the length of the seat member so that the shaft will reach the bottom of the rivet after injection. By constructing the notches 15 to form a rectangular raised section, the inner seat surface will be directly expanded over a wide area rather than at single points. In this way, each notch must be raised but a very slight degree, usually approximately .006 inch off the surface, to uniformly expand the seat member, and to retain the pin securely in position against vibration and pressures exerted. A further advantage is that one predominant groove will not be formed by each notch for the passage of water through the rivet. The lower end of the ridges on the pin member should never reach the top of the legs of seat member 1 after being fully set in order to prevent any seepage of water from the expanded portion around the ridges through the slot.

The entire rivet is preferably made of steel, the inner pin member having a greater hardness than the outer sleeve member in order that the grip portion and leg portion of the shank 3 will flexibly yield to the pressure of the notches and nose portion of the shaft 13 respectively when the pin member is driven into the outlet seat member.

The rivet is assembled and fastened onto the riveted material as follows: The outer seat member 1 is first inserted into the rivet hole 19 so that the head 2 is flush with the outer surface of the material 20 to be riveted. The sealing compound is then applied to the top surface of the head 2, before the seat member is inserted into the rivet hole. The pin member 9 is then positioned in the opening 7 and driven by means of a hammer and punch or other suitable means into the shank 3 until the head 10 engages the head 2. As the shaft 13 is driven into the opening 7, the nose 14 will engage the inner tapered surfaces of the prongs to spread them outwardly and laterally into contact with the inside surface of the riveted material. At the limit of this axial movement the outer portion of the nose 14 will rest against the tapered portion of the prongs 4 and thus positively hold the prongs in engagement with the riveted material. At the same time, the grip portion of the seat member 1 will have been expanded by the outward pressure of the notches 15 against the rivet hole surface. To prevent any seepage of water from the exterior of the rivet into the slot portion, the protected head surface is provided over the head 2 to prevent breaking or wearing away of the sealing compound which seals the scratches and gaps made by the notch portion when the pin member is driven into the seat member. The head 10 will also act as a positive stopping means to accurately position the pin member within the opening 7 and to insure a true alignment between the nose and leg portions, as well as a sealing container for the sealing compound.

Having now described one embodiment of my invention, it may be understood that the present invention is not to be limited to the specific form or arrangement of parts therein described and shown, since obviously, many changes within the scope of the following claims may be resorted to.

I claim:

1. In a waterproof rivet, at least two separate and structually different means for sealing said rivet, a sleeve member of a length sufficient to extend entirely through and beyond the thickness of the materials to be riveted, an annular flange on said sleeve, a smooth unthreaded surface on the interior of said sleeve, a plurality of legs formed at the distal end of said sleeve, an inwardly tapered camming portion on each leg, a pin member for insertion into said sleeve, a head on said pin, a curved annular portion on the underside of said head portion of less radius of curvature than that of the outer surface of the flange on the sleeve for providing a cavity, waterproofing and sealing compound in said cavity for forming a seal between said head portion and the annular flange on said sleeve, axially and circumferentially extending ridges forming enclosures on the cylindrical surface of said pin adapted to lie intermediate the flange and the leg portions of said sleeve when said pin is seated in said sleeve, a sealing and waterproofing compound in said enclosures for forming a seal between said pin and its enclosing sleeve, and a rounded end portion located on the distal end of said pin for camming the legs on said sleeve outwardly beyond the material being riveted for permanently securing said rivet.

2. In a waterproof rivet at least three separate and structurally different means for sealing said rivet, a sleeve member of a length sufficient to extend entirely through and beyond the thickness of the materials to be riveted, an annular flange on said sleeve, said flange having an annular cavity on its underneath portion surrounding said sleeve, waterproofing and sealing compound in said cavity, a smooth unthreaded surface on the interior of said sleeve, a plurality of legs formed at the distal end of said sleeve, an inwardly tapered camming portion on each leg, a pin member for insertion into said sleeve, a head on said pin, a curved annular portion on the underside of said head of less radius of curvature than that of the outer surface of the flange on the sleeve for providing a cavity, waterproofing and sealing compound in said cavity for forming a seal between said head portion and the annular flange on said sleeve, axially and circumferentially extending ridges forming enclosures on the cylindrical surface of said pin adapted to lie intermediate the flange and the leg portions of said sleeve when said pin is seated in said sleeve, a sealing and waterproofing compound in said enclosures for forming a seal between said pin and the sleeve, and a rounded end portion located on the distal end of said pin for camming the legs on the sleeve outwardly beyond the material being riveted for permanently securing said rivet.

References Cited in the file of this patent

UNITED STATES PATENTS

| Number | Name | Date |
| --- | --- | --- |
| 316,619 | Hayes | Apr. 28, 1885 |
| 547,988 | Bull | Oct. 15, 1895 |
| 1,872,014 | Schjolin | Aug. 16, 1932 |
| 2,056,309 | Osenberg | Oct. 6, 1936 |
| 2,199,271 | Schaefer | Apr. 30, 1940 |
| 2,531,048 | Huck | Nov. 21, 1950 |
| 2,555,420 | Richardson | June 5, 1951 |
| 2,640,618 | Hale | June 2, 1953 |

FOREIGN PATENTS

| 472,423 | Germany | Feb. 27, 1929 |